Dec. 21, 1943.   O. H. WATSON   2,337,513
COMPOSITE LEVER FOR WEIGHING SCALES
Filed Dec. 26, 1941
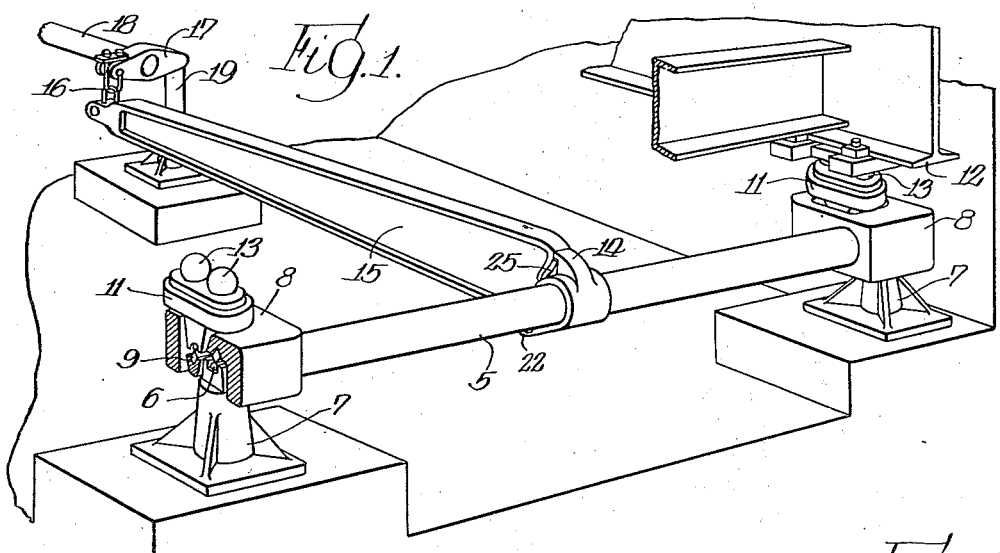
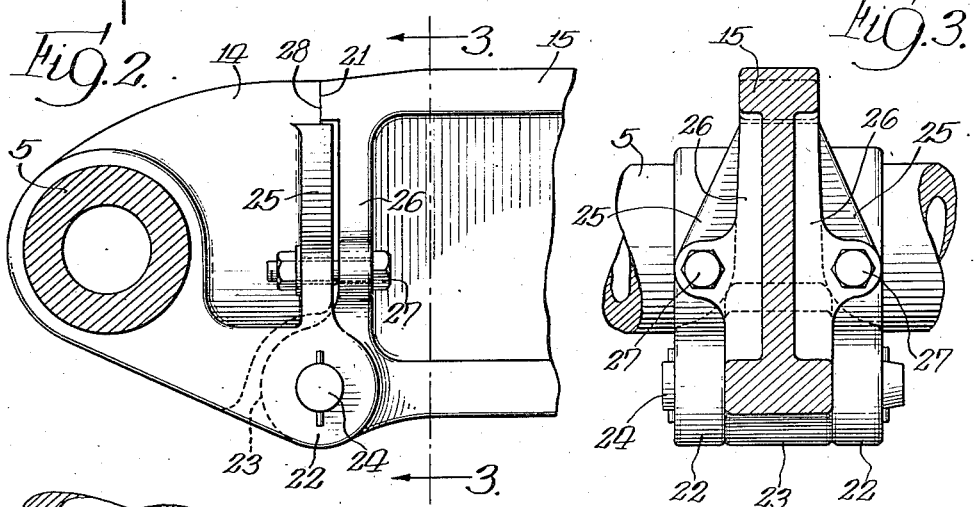
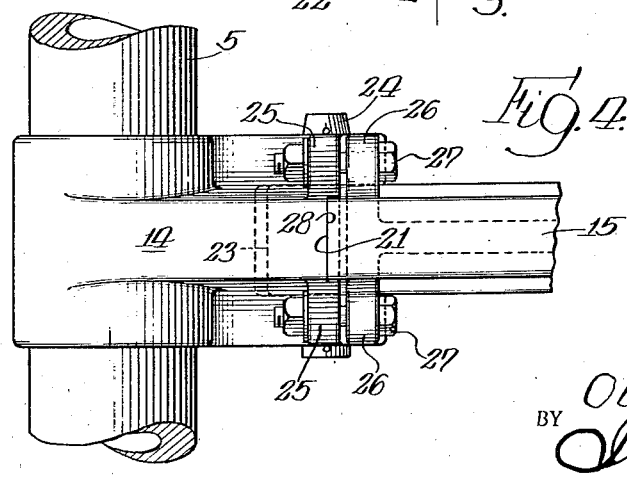
INVENTOR.
Oliver H. Watson,
BY Ira J. Wilson Atty.

Patented Dec. 21, 1943

2,337,513

UNITED STATES PATENT OFFICE 2,337,513

COMPOSITE LEVER FOR WEIGHING SCALES

Oliver H. Watson, Delavan, Ill., assignor, by mesne assignments, to Fairbanks, Morse & Co., a corporation of Illinois Application December 26, 1941, Serial No. 424,408

3 Claims. (Cl. 287—52.02)

This invention relates to weighing scales, and more particularly to the large type such as truck and railway car scales. There are in common use two types of scales of this character, one known as a straight lever scale and the other as a torsion lever scale. My invention relates to the torsion lever type in which the applied load transmits its effect through levers in such a way that a torque is imposed upon the member immediately supporting the load. The load effect is transmitted through this torque member to a straight lever, known as an extension lever, which transmits the load effect in reduced ratio. The torque member includes a rigid torsion head portion to which the extension lever is attached, the torsion head portion and the extension lever portion together forming a composite or two-piece rigid lever.

It has heretofore been the common practice to secure the torsion head portion and the extension lever portion together into a unitary lever by means of long bolts extending longitudinally of the lever. When the scale is in use the load effect upon the lever subjects these connecting bolts to a heavy tension strain which has a tendency to stretch the bolts, so as to thereby impair the accuracy of the scale.

The primary purpose of my present invention is to provide a connection between the torsion head portion and the extension lever portion which will not yield or give when subjected to load effects, but will maintain an unyielding and rigid connection between the lever portions and thereby maintain the accuracy of the scale.

Other structural, operational and manufacturing advantages will be appreciated as the invention becomes better understood by reference to the following description when considered in connection with the accompanying drawing.

Referring to the drawing,

Fig. 1 is a fragmentary perspective view of a scale embodying my invention;

Fig. 2 is a fragmentary side elevation showing my improved connection between the torsion head portion and the extension lever portion of the composite lever;

Fig. 3 is a sectional view on the line 3—3 of Fig. 2; and

Fig. 4 is a plan view of the structure shown in Fig. 2.

Referring to the drawing more in detail, reference character 5 indicates the torsion tube beneath one end of the platform supported upon knife-edge pivots 6 at each end, which in turn are carried upon standards or pedestals 7. The torsion tube heads 8 are provided with knife-edge pivots 9 carrying the supporting elements 11 upon which the framework 12 of the platform is supported through the intermediary of the ball bearings 13.

Intermediate its ends the torsion tube has rigidly mounted thereon a head 14 including a laterally extending portion to which the extension lever 15 is attached, to thereby provide a composite rigid lever of considerable length. The extension lever is connected through linkage 16 to an end member 17 of a side lever assemblage including the torsion tube 18. The remainder of the assemblage being of well-known construction is not here shown, except the pedestal 19 upon which the end member 17 is supported.

Referring now more particularly to Figs. 2 to 4, inclusive, it will be observed that torsion head 14 is shaped to provide a compression abutment 21 and a pair of spaced apart tension elements 22 in the form of ears to receive between them a complemental ear-shaped tension element 23 projecting from the lower portion of the extension lever 15. The tension elements 22 and 23 are rigidly connected together by a pin 24 extending through aligned openings formed in these elements. This pin establishes a rigid connection between the torsion head and the extension lever at the tension side of the composite lever. The load effect tending to separate the lower portions of the thus connected parts is applied to the connecting pin as a shearing force instead of a stretching force, as heretofore exerted upon the connecting bolts. The connecting pin completely resists this shearing force without deformation, thereby maintaining a rigid connection between the lever parts so as to obviate any factor of scale inaccuracy at this point.

For purposes of convenience in assembly, the parts 14 and 15 are provided respectively with laterally extending webs 25 and 26 provided with aligned openings to receive connecting bolts 27 by which the parts are maintained in predetermined relative position for permanent connection by the pin 24. For the insurance of accuracy the levers are held together by the bolts 27 with the compression abutment of the lever 15 abutting against the opposed compression abutment 21 of the head 14 and the tension element 23 disposed between the spaced tension elements 22. After being thus temporarily positioned, a continuous hole is bored through the elements 22 and 23, thereby insuring perfect alignment, whereupon the connecting pin 24 is driven into place with a drive fit. A rigid connection between the lever and head is thereby established in which the compression strains are transmitted through the abutting compression abutments 21 and 28 and the tension stresses are transmitted through the connecting pin 24 which, being subjected to shearing stresses only, is not subject to deformation under the impressed loads.

The bolts 27 are not relied upon to resist any of the stresses imposed upon the scale in operation and, in fact, may even be dispensed with after the permanent connection between the lever portions has been established by means of the tightly fitting pin 24.

It should be apparent from the foregoing that I have provided a composite lever consisting of a torsion head portion and an extension lever portion, in which a permanent absolutely rigid connection between the composite portions is established. This connection is capable of resisting all load stresses and strains imposed during operation of the scale and without deformation by stretching or otherwise. The connection being permanent and rigid affords no opportunity at this point for inaccuracy in the effective action of the scale.

The size, shape, proportion and arrangement of the parts illustrated and described may obviously be varied within wide limits without departing from the scope of my invention as defined in the following claims.

I claim:

1. A composite lever for weighing scales, comprising a torsion head portion provided with a compression abutment, a plurality of tension elements and laterally extending webs, an extension lever portion provided with a compression abutment, a tension element and laterally extending webs, means extending through the opposed webs of said elements to provide a temporary connection for said portions, and a pin having a drive fit extending through said tension elements in a direction transversely of the lever to provide a rigid connection between said lever portion and said head portion adapted to resist without deformation the tension stresses exerted on the lever.

2. A composite rigid lever for weighing scales, comprising a torsion head portion constructed for mounting on a torsion tube and having a face disposed substantially perpendicular to the longitudinal axis of the lever, said face being provided near one end thereof with a compression abutment and near the other end thereof with a tension element, an extension lever portion having a companion face provided near one end thereof with a compression abutment and near the other end thereof with a tension element, the abutments on the two portions being in contactual relation and the tension elements on the two portions being disposed in overlapping relation, and a drive fit pin extending through and rigidly connecting said tension elements so that the load effect upon the lever produces shearing stresses only on said pin.

3. A rigid composite lever for weighing scales, comprising a torsion head portion and an extension lever portion, said portion being provided with opposed compression abutments adapted to resist the compression stresses and with overlapping tension elements, said abutments and elements on said portions being cooperatively engaged on opposite sides, respectively, of the longitudinal axis of the lever, a pin extending through and rigidly connecting said tension elements so as to offer a shearing stress resistance to the tension stresses on the lever, and means located between said pin and said abutments affording a temporary connection between said head and extension lever portions preliminarly to the establishment of a permanent connection by said pin.

OLIVER H. WATSON.